(No Model.)
C. H. WISNER.
MINNOW TRAP.
No. 599,086.  Patented Feb. 15, 1898.
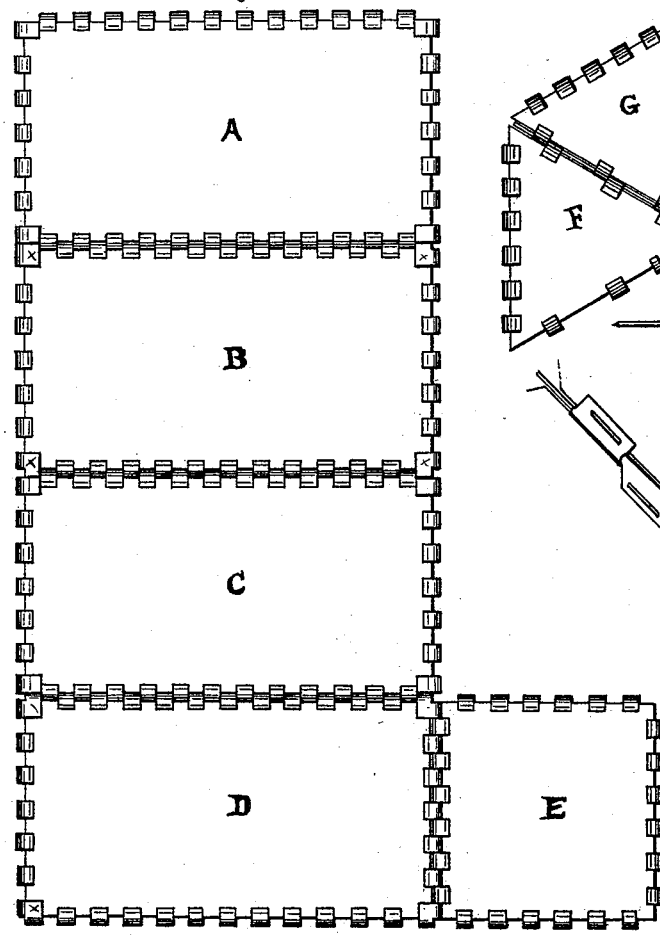
Witnesses
James S. Parner.
Ed. S. Lee.
Inventor
Charles H. Wisner

UNITED STATES PATENT OFFICE.

CHARLES H. WISNER, OF FLINT, MICHIGAN.

MINNOW-TRAP.

SPECIFICATION forming part of Letters Patent No. 599,086, dated February 15, 1898.

Application filed May 2, 1896. Serial No. 589,997. (No model.)

*To all whom it may concern:*

Be it known that I, CHARLES H. WISNER, a citizen of the United States, residing at Flint, in the county of Genesee and State of Michigan, have invented a new and useful Trap for the Capture of Minnows, of which the following is a specification.

My invention relates to improvements in the class of minnow-traps which consist of a box, cylinder, or other inclosure made of solid yet transparent material and having a suitable opening or openings in the form of the frustum of a hollow cone or pyramid projecting into the same and through which the minnows pass to reach the bait placed within the inclosure. Such traps require to be baited with finely-chopped meat, crushed bread, cracker-crumbs, or other like material, and to be effective must be constructed of solid material that the bait may be retained within the trap notwithstanding the natural movement of the water or the agitation of that within the trap as minnows accumulate and dart about therein. The material must also be transparent that the minnows may see the bait within the trap. Traps of this description have heretofore been constructed of glass, either blown in an egg-shaped form with the frustum of a hollow cone projecting inward at the larger end and having at the smaller end an orifice fitted with a metal cover capable of being opened or closed to remove the minnows or set the trap, as desired, or constructed of a blown-glass body of egg-shaped form fitted with frustums of hollow metal cones projecting into each end, the frustums being held in place by suitable metal rods and springs, which may be removed to empty the trap, or constructed of a rigid metal frame of square or triangular form supporting the sides, end, and frustum of ordinary flat window-glass.

My invention consists, first, in the manufacture of the inclosure constituting the trap of that transparent material the basis of which is camphor and guncotton and which is commonly known and sold in the market under the name of "transparent celluloid," combined with, held in place, and made sufficiently rigid by suitable supports of metal or other material of proper rigidity, or so constructed of celluloid alone as to be self-supporting; second, in so constructing the trap, as aforesaid, that it may be readily dissected and erected again to fit it for economy of space in transportation or for use, as desired.

While celluloid has never been applied to the purpose indicated, it is, when combined with proper supports or so constructed as to be self-supporting, a perfect material for such use, possessing the necessary transparency combined with lightness and strength. It is capable of withstanding without injury all usage to which the article is naturally subjected either in transportation or use and has none of the objectionable qualities of glass, to which attention has been called. A trap constructed of celluloid is also more efficient in practical use than is one of the old style, which advantage will be more fully explained later on in this specification.

That which I have found to be the best mode of construction for my invention is illustrated by the accompanying drawings, in which—

Figure 1 shows five sheets of material that form the sides and one end of the trap. Fig. 2 shows four sheets of material that are employed to form the reëntering or concave end of the trap. Fig. 3 is a detail of one trihedral angle of the trap when the parts are assembled. Fig. 4 shows in detail the staple clip and wire used to form the hinged joint. Fig. 5 is an outline perspective of the complete trap.

Fig. 1 represents five sheets of transparent celluloid—A, B, C, D, and E—hinged together. The joint is made by attaching to all edges of the sheets clips of the same material, so placed that when the edges of the respective sheets are brought together the clips pass by each other and the cylindrical openings through the same are brought into line. A straight wire, snugly fitting, is then passed through the openings, thus hinging the parts together. The wires forming the cores of the hinges between sheets A, B, C, D, and E of Fig. 1 are cut off flush with the edges of the sheets and are to remain permanently in place, and such sheets so hinged together are to form the sides, top, and bottom and back end of the trap.

To erect the trap, the longer free edges of sheets A and D, Fig. 1, are brought together and a straight wire with a small ring turned on the end (of the form shown by Fig. 4, letter M) is passed from right to left through the clips already described. Sheet D then forms the bottom of the box. Sheet E is then to be turned on its permanent hinge up against the ends of sheets A B C. A ringed wire, already described, is then passed horizontally from right to left through the clips attached to the edges of sheets B and E. The edges of sheets A and E and C and E are then secured to each other by like wires inserted downward and being made an inch or more longer than the depth of the box to form legs, by means of which the trap is held against the current of the stream when set. The wire attaching the ends of sheets A and E passes downward at the bottom of the box through the ring in the end of the wire which secures A to D, and the wire which attaches C and E together passes downward at the top through the ring in the end of the wire which secures B to E. This completes the erection of the trap, except the front or entrance end thereof.

Fig. 2 shows the form of construction of the front or entrance end of the trap. F, G, H, and I are sheets of transparent celluloid cut in the form of a transverse section of the frustum of a pyramid, as shown. They are hinged together in the same manner as described in the explanation of Fig. 1.

When the free inner edges of sheets F and I, Fig. 2, are brought together and the wire J is passed through the clips attached to the edges thereof, the frustum of a hollow pyramid will be formed. This is to be inserted into the end of the trap already erected, and the four base edges of the sheets forming said frustum are to be attached to the front ends of sheets A B C D in the same manner as the back end is secured to the sides of the box, which has already been particularly described. The trap is now fully erected.

Fig. 5 shows the outline of the trap in perspective when fully erected for use.

Fig. 3 shows the detail of one corner of the trap and will serve to illustrate all corners so far as the mode of attaching the parts together is concerned.

Fig. 4 shows the mode of construction of the clips, fastenings for the same, and the wire for insertion. K is a metal staple, preferably of No. 24 soft brass wire. L is a clip formed by bending a piece of celluloid around a wire of the same size as that used for the core of the hinge-joint. The clips are fastened to the sheets of celluloid by placing the edge of the sheet between the leaves of the clip, then passing the staple K through the leaves and intervening sheet. The staple ends are then pressed down flat toward each other. A greater or less number of clips may be used as greater or less rigidity is desired.

The clips described may be of metal or any substance capable of being bent into such form, or the same may be formed on the edge of the sheet and the free end bent round and secured with the staple or otherwise fastened; but the clips are more satisfactory, being less conspicuous, when constructed of celluloid of the same kind used in the construction of other parts of the trap. They are also better constructed in the manner shown for the reason that the edge of the inserted sheet forms a shoulder for the core of the hinge to press against, thus keeping the edge of the sheet in line and tending greatly to increase the rigidity of the entire structure.

The free inner edges of sheets F and I, Fig. 2, are merely so left for convenience of illustration. In practice the wire J is left permanently in place, as the frustum will collapse flat and take the form of the outline of two of the sheets forming the same, thus fitting it for packing and making it to occupy less surface than one of the sheets forming the sides, top, and bottom of the box. The free edges of sheets A and D, Fig. 1, require to be so left for packing that that part of the trap may be so folded flat and made to assume the form of one sheet only, as sheet A, Fig. 1. If said edges were permanently attached, that part of the structure could only be made to assume the flat form of two of said sheets, as A and B, Fig. 1.

The uncolored transparent celluloid sheets, one one-hundredth of an inch in thickness, now a recognized article of commerce, combinde with No. 16 hard brass wire for the core of the hinges and No. 24 soft brass wire for the staples, are the most suitable materials for constructing the trap described.

The size of the trap should be six by six by ten and one-half inches, the sheets forming the frustum being six inches at the base and from center of base (measuring on a line drawn through the center of the base and at right angles thereto) to apex three and one-half inches, the line of apex parallel with the base one and one-fourth inches long, the slope of sides being cut to strike the respective ends of base and apex.

Captured minnows are removed from the trap by withdrawing one of the ringed wires attaching the back end of the trap to the sides. Slight pressure being then applied endwise to the edges thus released an elliptical opening will be formed through which the trap may be emptied.

To partially dissect the trap for transportation, the four wires with ringed ends securing the frustum to the front end of the box are withdrawn. The frustum is then collapsed flat, assuming the form of two of its sheets, as already mentioned. The three removable ringed wires securing the sides and top of sheet E, Fig. 1, to the body or sides and top of the box are withdrawn and sheet E is turned back on its permanent hinge. The ringed wire securing sheets A and D together is withdrawn and sheets A, B, C, D, and E assume the form shown by Fig. 1. A, B, C, and D of said figure are then folded back and forth upon each other, sheet E turned back onto sheet D, the collapsed frustum placed thereon, and the trap is ready for its box. The trap may be erected for use in three minutes or less and partially dissected for packing in thirty seconds.

When constructed as described, the trap weighs but five ounces, as against four pounds for the old material and form of construction. A box for its secure transportation is made from soft wood one-eighth of an inch thick and weighing eight ounces, as against six pounds for the box required to safely transport a trap of the old kind.

My invention requires a box measuring on the outside six and three-eighths by ten and seven-eighths by one-half inches, as against seven and one-half by seven and one-half by twelve inches for the smallest practical size of the old form of construction.

In view of the facts as I have found them I aver that celluloid is not only a lighter, stronger, and better material in a mechanical sense to be used in the construction of traps for the capture of minnows, but its use necessarily involves a new mode of construction, as herein stated, and in actual use it is more efficient for the purpose than is any material of which such traps have heretofore been constructed, which last-named quality could only be discovered by the actual use of the trap constructed of such material. I attribute this quality to two causes: First, while sufficiently transparent for the purpose, it is not perfectly clear as now upon the market, but possesses a tinge peculiar to itself. This tinge resembles very closely water slightly muddy or roily, as it ordinarily appears at the bottom of a stream or pond when the water is there agitated by minnows darting about and struggling to obtain from each other particles of food there discovered. This resemblance tends to prevent the alarm minnows are observed to exhibit when any strange object of considerable size is first placed in the water frequented by them. They therefore more quickly seek to obtain the food floating about in the water within the trap. Second, being flexible and slightly yielding to the touch, it undoubtedly bears some resemblance (not possessed by glass) to the resistance experienced by the fish when it comes in contact with aquatic plants and grasses. Consequently the minnow is not so greatly alarmed when it runs against the walls of the trap and therefore more quickly seeks and finds the way to reach the food within.

Regarding mode of construction, my invention is not limited to the use of metal in the manufacture of the supports for the celluloid sheets, but any material possessing the necessary rigidity may be employed for such purpose. Supports of celluloid may be used. The sheets may be laced together and secured in various ways. Neither is the invention limited to the form of construction, as many forms may be employed and the trap so constructed of celluloid alone as to be self-supporting, and in various ways it may be so constructed as to be partially dissectible to fit it for economy of space in transportation.

Having described my invention and explained its advantages, what I claim, and desire to secure by Letters Patent, is—

A trap for the capture of minnows consisting of an inclosure formed of separate sheets of transparent celluloid, combined with an opening into the same in the form of the frustum of a hollow pyramid, each of the angles of such inclosure and frustum being secured and combined with a hinge-joint, the core of which hinge may be withdrawn and the inclosure and frustum dissected, wholly or partially as desired, and erected again, substantially as described.

In testimony whereof I have hereunto signed my name this 29th day of April, A. D. 1896.

CHARLES H. WISNER.

Witnesses:
 JAMES S. PARKER,
 ED. S. LEE.